(12) United States Patent
Strange et al.

(10) Patent No.: US 6,246,569 B1
(45) Date of Patent: Jun. 12, 2001

(54) ELECTROLYTIC CAPACITOR AND METHOD OF MANUFACTURING

(75) Inventors: Thomas F. Strange, Owens Crossroads, AL (US); Paul Lunsmann, Birchgrove (AU)

(73) Assignee: Pacesetter, Inc., Sunnyvale, CA (US)

( * ) Notice: Subject to any disclaimer, the term of this patent is extended or adjusted under 35 U.S.C. 154(b) by 0 days.

(21) Appl. No.: 09/352,714

(22) Filed: Jul. 13, 1999

Related U.S. Application Data

(62) Division of application No. 08/968,658, filed on Nov. 12, 1997, now Pat. No. 5,968,210.

(51) Int. Cl.[7] .............................. H01G 9/04; H01G 9/145; H01G 9/00
(52) U.S. Cl. ..................... 361/508; 361/516; 29/25.03
(58) Field of Search ..................... 361/500, 503, 361/508, 509, 510, 511, 512, 513, 514, 515, 516, 517, 520; 29/25.03

(56) References Cited

U.S. PATENT DOCUMENTS

| | | | |
|---|---|---|---|
| 4,267,566 | 5/1981 | Moresi, Jr. ........................ | 361/433 |
| 4,942,501 | 7/1990 | MacFarlane et al. ............... | 361/523 |
| 4,970,626 | * 11/1990 | Kakinoki et al. ................... | 361/512 |
| 5,131,388 | 7/1992 | Pless et al. ......................... | 128/419 |
| 5,146,391 | 9/1992 | MacFarlane et al. ............... | 361/525 |
| 5,153,820 | 10/1992 | MacFarlane et al. ............... | 361/525 |
| 5,584,890 | * 12/1996 | MacFarlane et al. ............... | 29/25.03 |
| 5,660,737 | * 8/1997 | Elias et al. ......................... | 216/6 |
| 5,748,438 | * 5/1998 | Davis et al. ........................ | 361/504 |
| 5,930,109 | * 7/1999 | Fishler ............................... | 361/508 |
| 5,968,210 | * 10/1999 | Strange et al. ..................... | 29/25.03 |

FOREIGN PATENT DOCUMENTS 4184811   7/1992   (JP) .

* cited by examiner

Primary Examiner—Anthony Dinkins
Assistant Examiner—Eric Thomas
(74) Attorney, Agent, or Firm—Steven M. Mitchell

(57) ABSTRACT

A method of manufacturing a capacitor by highly etching a foil sheet, and at selected relief portions of the sheet, reducing the surface area coefficient. An anode sheet is cut from the foil sheet and assembled with other capacitor components. The surface area coefficient may be reduced by coining or mechanically compressing at the selected relief portions, and an oxide layer may be formed on the sheet after coining.

9 Claims, 2 Drawing Sheets

ELECTROLYTIC CAPACITOR AND
METHOD OF MANUFACTURING

This is a divisional of application Ser. No. 08/968,658, filed on Nov. 12, 1997 now U.S. Pat. 5,968,210.

FIELD OF THE INVENTION

The invention relates to capacitors, and more particularly to capacitors having an etched foil anode layer.

BACKGROUND AND SUMMARY OF THE INVENTION

Electrolytic capacitors are normally formed with a conductive anode sheet and a conductive cathode sheet with paper separator sheet between to form a thin sandwich. An electrolyte impregnated in the separator sheet functions as the cathode in continuity with the cathode sheet, with an oxide layer on the anode functioning as a dielectric.

In cylindrical capacitors, the sandwich is tightly rolled along with another separator sheet; in flat capacitors, multiple sandwiches are stacked with insulating sheets between. Where a high capacitance per unit volume is needed, highly etched anode foil has been employed. Highly etched foil has a deeply microscopically contoured surface having a total surface area much greater than the flat area of a given sheet. A surface area coefficient, the ratio of the microscopic true surface area to the macroscopic apparent area, may be as high as 100 in current devices, permitting miniaturization of capacitor components.

In manufacturing such miniature capacitors, a dielectric oxide layer is formed on the etched anode sheets to function as a dielectric for the capacitor. However, this embrittles the sheet, leading to several disadvantages. In rolled capacitors, the brittle sheet does not readily roll to a tight radius; too tight of a radius leads to unacceptable cracking and fractures, and too loose of a roll radius leaves a large vacant core in the finished capacitor, increasing component volume. In both rolled and flat capacitors, cutting the desired shapes from the etched and oxidized master anode sheet can lead to fractures and chipping at the edges of the cut sheets. These may contribute to shorts, or require additional tolerances to be built into the component design, increasing volume. In some cases, sharp edge fragments may penetrate the separator material and cause a shorting component failure.

It is also difficult to connect the anode sheet to a component lead, as conventional welding and compressive techniques may damage the fragile material. Flat capacitors in particular have extending tabs that must flex in order to be brought together for welding; brittle material is poorly suited for this. Even in routing handling during manufacturing, oxidized anode layer sheets are vulnerable to damage that reduces manufacturing yields.

Past efforts to reduce these problems have employed selectively etched master sheets, with critical regions masked to prevent etching, and thereby limiting brittleness after oxide formation. However, such efforts increase the cost of procuring anode sheet material, impede design changes, and complicate inventory management.

The present invention overcomes the limitations of the prior art by providing a method of manufacturing a capacitor by highly etching a foil sheet, and at selected relief portions of the sheet, reducing the surface area coefficient. An anode sheet is cut from the foil sheet and assembled with other capacitor components. The surface area coefficient may be reduced by coining or mechanically compressing at the selected relief portions, and an oxide layer may be formed on the sheet after coining.

DETAILED DESCRIPTION OF A PREFERRED EMBODIMENT

Figure 1:
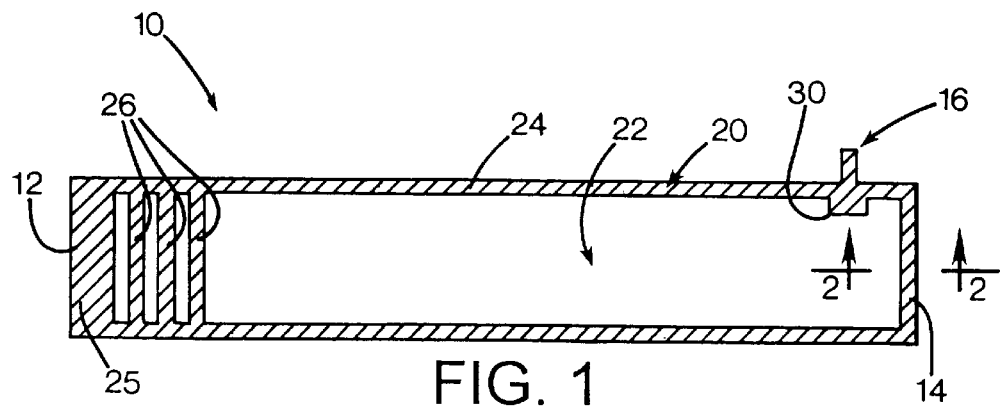
FIG. 1 shows an anode sheet according to a first embodiment of the present invention.

FIG. 1 illustrates an anode sheet 10 for a cylindrical capacitor. The sheet is an elongated rectangle of highly etched aluminum sheet, and has an inner end 12 and an outer end 14. Near the outer end, a contact tab 16 extends from the periphery along a major edge. The anode sheet is patterned with a flattened relief region 20 (shown as shaded) that has been compressed to reduce or eliminate the etched contours of the remaining etched region 22. The relief region includes a peripheral band 24 extending about the entire periphery of the sheet, so that the edges of the sheet are all spaced at least slightly away from the etched region 22. The region 20 is preferably kept to a minimum so that the loss in capacitance is a minimum.

An inner end patch 25 is a rectangular region extending a selected distance, greater than the width of the peripheral band 24, from the inner end 12 of the sheet. This facilitates the tight radiuses required to wrap the sheet about a thin spindle to form a compact cylindrical capacitor. Several relief bands 26 are spaced from each other and from the inner end 12 in a parallel array oriented perpendicular to the major axis of the sheet. These provide ready flexing to wrap the sheet to an intermediate radius, while preserving as much of the etched region spaces between the bands as is possible to benefit from the enhanced capacitance provided thereby. The entire tab 16, and a surrounding region 30 extending inward from the peripheral band are also part of the relief region. Thus, the tab may flex for connection to other components, and electrical connections may be made directly to the surrounding region, such as required to connect separate tabs by cold welding or staking in the absence of an integral tab.

In one example of a preferred embodiment, the sheet 10 is 1.0 meters long, 2.0 cm wide, and formed of 99,99 aluminum of 100 micron thickness. The peripheral band 24 is between 1.0 and 5.0 mm wide, and the inner end patch 25 extends 5.0 mm from the inner end 12. The relief bands 26 are between 1.0 and 5.0 mm wide, and are spaced apart by 1.0 to 10.0 cm. To accommodate the changing radius to which the sheet is wound, the relief bands may progressively narrow as they increase in distance from the inner end, and/or may be progressively more widely spaced apart.

Figure 2A:
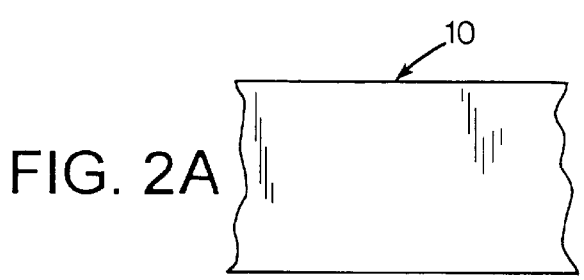
FIGS. 2a–2e show enlarged sectional views showing a sequence of manufacturing the anode sheet of FIG. 1.
Figure 2B:
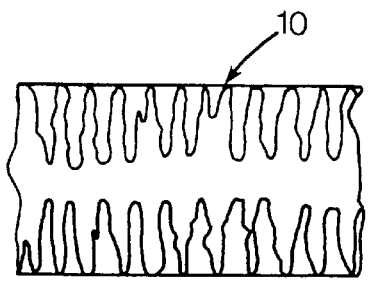

FIGS. 2a–2e show the sequence of manufacturing the anode sheet 10. Initially, a flat aluminum sheet is provided as shown in FIG. 2a. The sheet is highly etched using specialized and well known techniques to achieve the contours shown symbolically in FIG. 2b. Preferably, the sheet is etched to a surface area coefficient of 40 times greater etched surface area than original flat macroscopic surface area. A master sheet from which multiple anode sheets 10 will be made is etched over essentially its entire useful area.

Figure 2C:
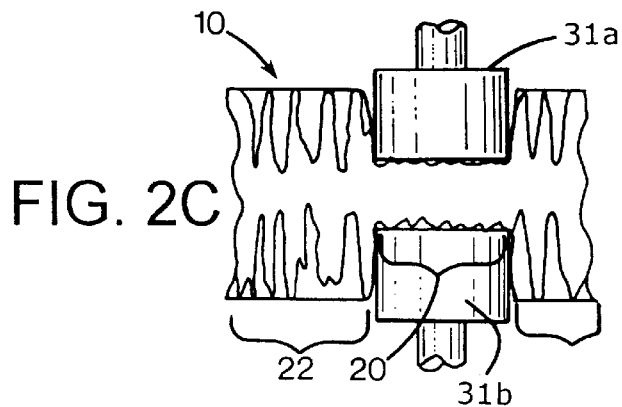

As shown in FIG. 2c, the sheet 10 is compressed forcefully at the relief regions 20, while preserved at its full thickness at the remaining regions 20. Preferably, the thickness is reduced by a coining process in which a pair of opposed tools 31a and 31b are brought together as shown schematically. For most applications, it is contemplated that the tools may be substantially flat rigid plates having serrations, a rough surface or other pattern to grip the material during squashing and minimize sideways cold flow. The plates further have raised portions corresponding to the relief portions 20. The tools 31a and 31b may alternatively have a radius or taper at the edge to control the shape of the transition from etched to compressed foil. In a further alternative, a single tool may compress the sheet against a flat plate for similar results, or a repeating pattern may be produced by a pair of rollers embossed with the desired pattern. For rapid design changes without tooling investment during prototyping, a programmable stylus may "draw" the desired pattern.

The thickness reduction serves to reduce the surface area coefficient to near 1, achieving an essentially flat surface. In a highly etched material, a full compression to eliminate etched voids will reduce the thickness up to about half of the original thickness. Where only partial flexibility is needed, and intermediate capacitance desired, the compression may be to a limited degree less than a full compression. Although the preferred embodiment contemplates simple compression to provide enhanced flexibility, the same results may be achieved by other means such as abrasion, polishing, melting, welding, or void filling to generate a surface with a reduced surface area coefficient.

Figure 2D:
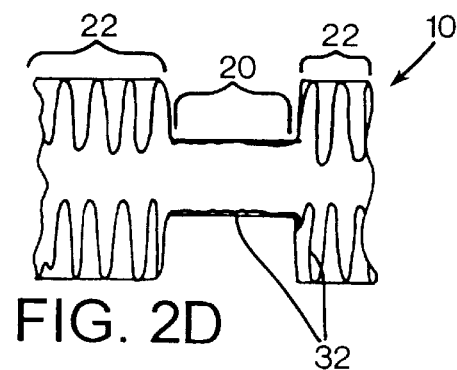

After coining, an oxide layer 32 is formed on the anode sheet surface, as shown in FIG. 2d by heavier lines. Oxide mass is proportional to actual surface area. Consequently, the effect of coining to reduce the surface area coefficient is to reduce the quantity of oxide formed per macroscopic surface area in the relief regions. As oxide is brittle and inflexible compared to the aluminum base material, this facilitates bending and cutting during later processing. While the convoluted oxide layer in the etched region 22 is like a brittle honey comb structure, prone to fragmentation when cut and resistant to bending, the oxide layer in the relief region is a flat skin over a ductile base, tolerating bending and cutting without difficulty.

Figure 2E:
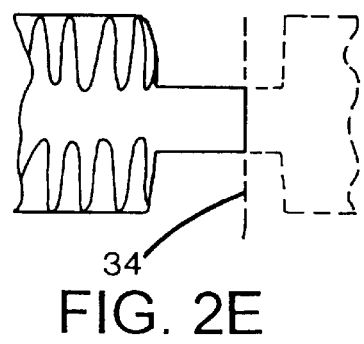

The anode sheets are cut from the master sheet along cut line 34, as shown in FIG. 2e. The cut lines surround the entire sheet, and preferably remain entirely within the peripheral band 24, so that the cut does not cross into a highly etched region 22. To provide clearance for the cut, the peripheral band will extend beyond the cut line, either to an immediately adjacent part on the master sheet, or to waste material separating adjacent anode sheets.

Figure 3:
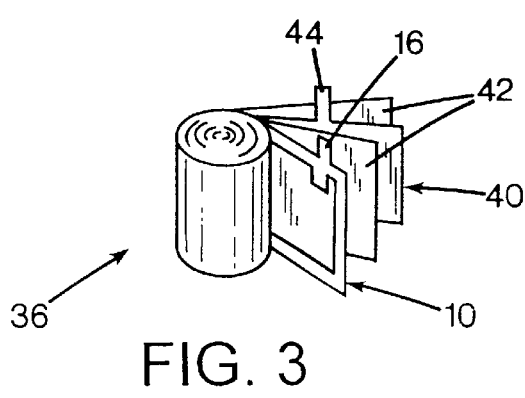
FIG. 3 shows a partially assembled capacitor according to the embodiment of FIG. 1.

FIG. 3 shows a capacitor 36 formed as a rolled sandwich. The sandwich includes the anode sheet 10, a cathode foil sheet 40 overlaid with the anode, a paper separator sheet 42 between the anode and cathode, and a second separator sheet 42 outside of the cathode to prevent contact as the sandwich is rolled. The anode tab 16 and a cathode tab 44 extend from the end face of the rolled unit, at offset locations for independent attachment to external circuitry.

Figure 4:
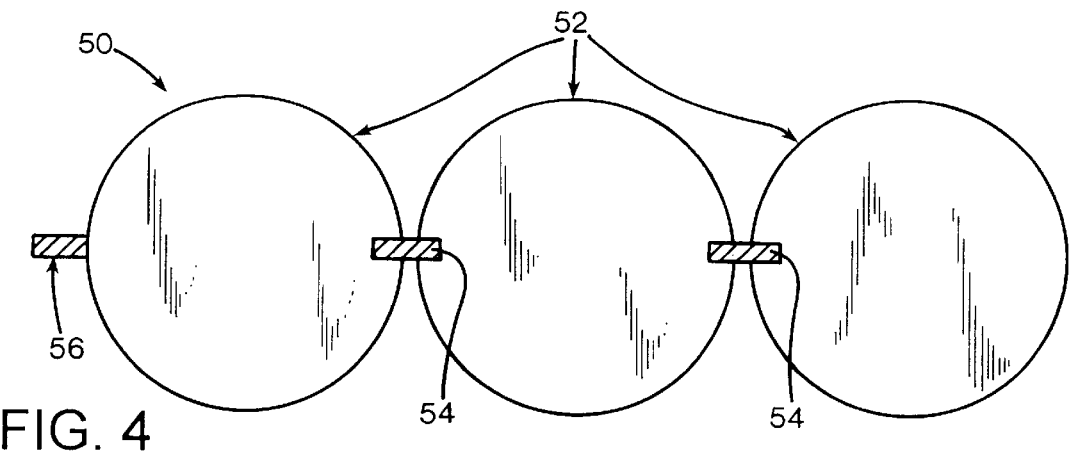
FIG. 4 shows an anode sheet according to a second embodiment of the present invention.

FIG. 4 shows an alternative anode sheet 50 for use in a flat capacitor in which anode sheets and cathode sheets are stacked, not rolled. The sheet 50 has several layer elements 52 that are interconnected as a unitary sheet by the process discussed above. The layer elements 52 are connected in a row to adjacent elements by small web or hinge elements 54. The hinge elements and adjacent portions of the layer elements are flattened to provide a relief region (shaded) to facilitate bending or folding to a tight radius. A connection tab 56 is also flattened as part of the relief region to permit connection to other circuitry after assembly.

Figure 5:
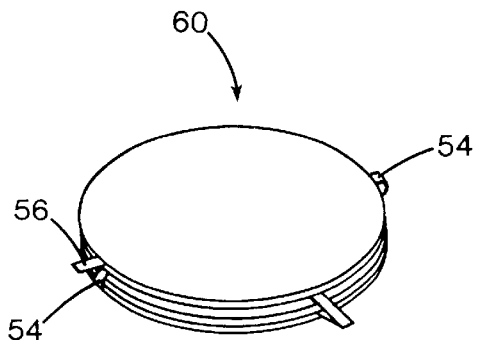
FIG. 5 shows a partially assembled capacitor according to the embodiment of FIG. 4.
Figure 6:
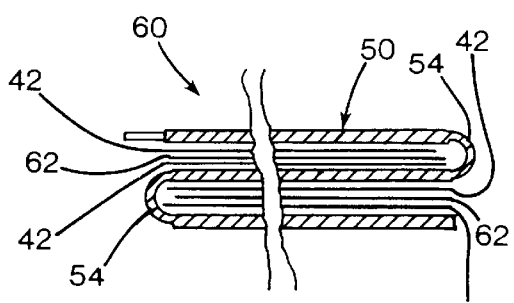
FIG. 6 shows an enlarged sectional view of the capacitor of FIG. 5.

FIGS. 5 and 6 show an assembled flat capacitor stack 60. The anode 50 is folded in a zigzag configuration, with a separator sheet 42 at each anode surface, and a cathode layer 62 positioned between each pair of separator-protected anode layers. The etched portions, covering the majority of each cathode layer, remain flat and rigid, while the compressed hinges withstand all the bending or folding required. Although the configuration is shown as folded, the compressed hinge relief areas may serve as a cut location for separating the formed sheet without damage in a second cutting step. Also, the example is shown with three anode layers for simplicity, while the preferred embodiment may include a multitude of layers limited only by design requirements. Further, the periphery may be any desired shape such as rectangular, half oval, or any shape required to fit within a selected space within a miniature electronic instrument.

Figure 7:
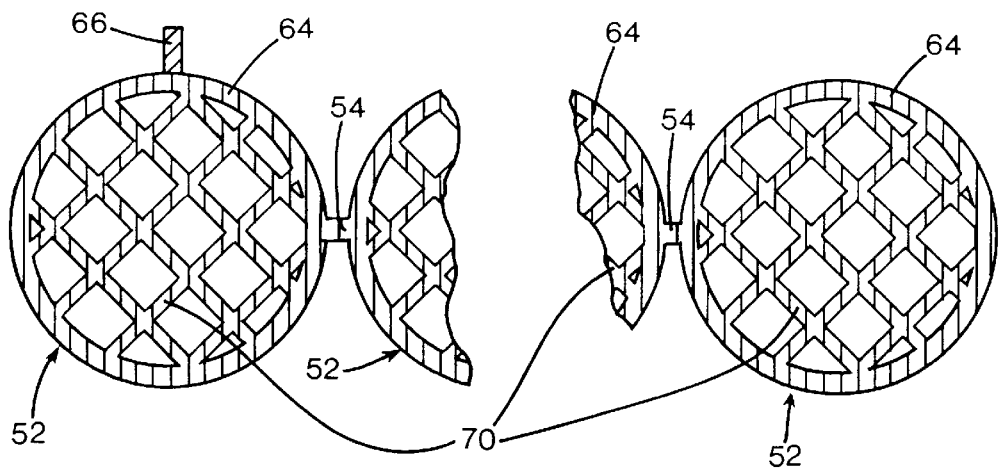
FIG. 7 shows an anode sheet according to a third embodiment of the present invention.

FIG. 7 shows and alternative anode sheet for a flat capacitor. The relief region includes full peripheral bands 64, a tab 66, and a reinforcing grid pattern 70 that crisscrosses the major portion of each anode layer element 52. The grid allows the material to flex in response to unintended forces during assembly, for generally enhanced resilience.

While the invention is described in terms of a preferred embodiment, the following claims are not intended to be so limited. Any of the different features formed in the disclosed relief regions may be used alone or in combination. In addition, the principles discussed for the manufacturing an anode sheet may be readily applied to a cathode sheet, with either or both to be so formed in a single capacitor.

What is claimed is:

1. An electrolytic capacitor comprising:
   a conductive foil anode sheet;
   a conductive foil cathode sheet adjacent the anode sheet;
   a separator layer between the anode sheet and the cathode sheet;
   the anode sheet including a highly etched major surface portion having a first thickness and a first surface area coefficient; and
   the anode sheet having a relief surface portion having a second lesser thickness and a second lesser surface portion coefficient.

2. The capacitor of claim 1 wherein the relief surface portion is positioned at a peripheral portion of the anode sheet, such that a lead may be connected to the relief portion.

3. The capacitor of claim 2 wherein the relief surface portion extends about a substantial portion of the periphery of the anode sheet.

4. The capacitor of claim 1 wherein the anode sheet, cathode sheet, and separator layers are elongated sheets rolled into a cylindrical shape, and wherein the relief surface portion is positioned at a first end of the sheet comprising a core of the rolled sheet.

5. The capacitor of claim 4 wherein the relief surface portion comprises a plurality of linear figures oriented perpendicularly to a major axis of the anode sheet.

6. The capacitor of claim 4 wherein the relief surface portion comprises a peripheral region at least partly surrounding a major central region, and wherein the relief surface portion of the central region is limited to a minor portion of the central region.

7. The capacitor of claim 1 wherein the anode sheet comprises a plurality of segments interconnected at hinge portions, and wherein a plurality of said relief portion are coextensive with the hinge portions.

8. The capacitor of claim 7 wherein the anode sheet is folded at the hinge portions to provide a multi layer stack.

9. The capacitor of claim 8 wherein the cathode sheet includes separate a plurality of segments, each interleaved between a pair of the anode sheet segments, and wherein the capacitor further includes a plurality of separator sheets, each interleaved between one of the anode sheet segments and an adjacent one of said cathode sheet segments.

* * * * *